United States Patent [19]

Kanazawa et al.

[11] 4,288,357

[45] Sep. 8, 1981

[54] COATING COMPOSITION AND METHOD FOR THE IMPROVEMENT OF SURFACE HARDNESS OF ARTICLE BY THE USE THEREOF

[75] Inventors: Hiroyuki Kanazawa; Mikio Futagami, both of Niihama, Japan

[73] Assignees: Sumitomo Chemical Co. Ltd.; Nippon Sheet Glass, both of Osaka, Japan

[21] Appl. No.: 71,585

[22] Filed: Aug. 31, 1979

Related U.S. Application Data

[62] Division of Ser. No. 902,736, May 3, 1978, Pat. No. 4,190,699.

[30] Foreign Application Priority Data

May 10, 1977 [JP] Japan .................................. 52-53946

[51] Int. Cl.³ .............................................. C08K 5/54
[52] U.S. Cl. ........................ 260/31.2 N; 260/33.2 R; 260/33.4 R; 428/412
[58] Field of Search ...................... 260/31.2 N, 33.2 R, 260/33.4 R, 33.6 UA; 526/303, 312

[56] References Cited

U.S. PATENT DOCUMENTS

| | | | |
|---|---|---|---|
| 3,389,114 | 6/1968 | Burzynski | 260/32.8 |
| 3,389,121 | 6/1968 | Burzynski | 260/46.5 |
| 3,451,838 | 6/1969 | Burzynski | 117/33.3 |
| 3,460,980 | 8/1969 | Burzynski | 117/132 |
| 3,554,698 | 1/1971 | Burzynski | 23/182 |
| 3,816,170 | 6/1974 | Mudde | 260/33.4 R |
| 3,894,881 | 7/1975 | Suzuki | 106/287 |
| 4,028,300 | 6/1977 | Wake | 260/31.2 R |

*Primary Examiner*—Paul R. Michl
*Attorney, Agent, or Firm*—Birch, Stewart, Kolasch and Birch

[57] ABSTRACT

A coating composition comprising (A) partially hydrolyzed silicon compounds, (B) an acrylic copolymer and/or a polyol and optionally (C) an etherified methylolmelamine, which is useful for improving the surface properties, such as surface hardness and chemical resistance, of plastics products, wooden products, metallic products, etc. by coating the products therewith, said products being optionally previously under-coated with an under coating composition comprising a copolymer of vinyl monomers and optionally other copolymerizable monomer(s), by which the adhesion between the coating film and the base material is improved to give a formed article having excellent properties, such as surface hardness, abrasion resistance, etc.

6 Claims, No Drawings

COATING COMPOSITION AND METHOD FOR THE IMPROVEMENT OF SURFACE HARDNESS OF ARTICLE BY THE USE THEREOF

This application is a divisional of copending application Ser. No. 902,736, filed on May 3, 1978 now U.S. Pat. No. 4,190,699.

The present invention relates to a coating composition and a method for improvement of a surfaces hardness of various products by applying the same. More particularly, it relates to a coating composition useful for improving the surface properties, such as surface hardness and chemical resistance, of plastics products, wooden products, metallic products, or the like, and to a method for improvement of a surface hardness of these products by applying the coating composition to the surface of the base products such as plastics products, wooden products, metallic products, or coated products thereof, preferably after forming an under coating layer having an excellent adhesion, and further to a formed article having an excellent abrasion resistance which is produced by applying an under coat onto the surface of a base product, baking the under coated product, applying the coating composition thereto, and then baking the resultant.

Plastics, for example plastics such as polycarbonate, polymethyl methacrylate, polystyrene and polyvinyl chlorine, are useful for many applications because of their light weight, easy processability and high impact resistance. However, these materials are inferior in abrasion resistance and solvent resistance and the surface thereof are readily injured by rubbing and furthermore are easily swollen or dissolved by solvent contact.

In order to eliminate these defects, it is proposed to coat the surface of the plastics with various thermosetting resins, such as melamine resin, thermosetting acrylic resin, polyester resin, polyurethane resin, or silicone resin. However, even by using these resins, it is difficult to obtain the desired product being satisfactory in all properties, such as surface hardness, abrasion resistance, hot water resistance, weatherability, or the like. When the hardness of the coating film is increased, it occasionally results in loss of flexibility and crack of the film by the test for the hot water resistance. On the other hand, when the flexibility of the film is increased, it results in lowering of the hardness of the coating film. Besides, the coating film is inferior in an adhesion to plastics such as polycarbonate or metals such as aluminum.

The present inventors have intensively studied to find an improved coating composition which can give a coating film having both excellent hardness and excellent flexibility without deteriorating other properties, such as hot water resistance and weatherability. As the result, it has been found that the desired coating composition can be obtained by incorporating specific silicon-containing compounds and specific organic compounds, and further that when a base material is coated with the coating composition and followed by baking thereof, the product is improved in its abrasion resistance, and further, when an under coat layer is formed between the layer of the coating composition and the base material, the adhesion of the coating layer to the base material is improved, and thereby, the properties, such as abrasion resistance, adhesion and solvent resistance, of the product are improved.

An object of the present invention is to provide an improved coating composition useful for improving the surface properties such as surface hardness and chemical resistance of various products, such as plastics products, wooden products, or metallic products.

Another object of the invention is to provide a method for improvement of a surface hardness of these products.

A further object of the invention is to provide a coated article having an excellent abrasion resistance.

Other objects of the invention will be apparent from the following description.

The coating composition of the present invention comprises:

(A) 100 parts by weight of partially hydrolyzed silicon compounds consisting essentially of co-partial hydrolyzates of a tetraalkoxysilane of the formula: $Si(OR^1)_4$ wherein $R^1$ is an alkyl having 1 to 4 carbon atoms and an organic silicon compound of the formula: $R_n^2Si(OR^3)_{4-n}$ wherein n is an integer of from 1 to 3, $R^2$ is a hydrocarbon group having 1 to 6 carbon atoms and $R^3$ is an alkyl having 1 to 4 carbon atoms and/or a mixture of partial hydrolyzates of each tetraalkoxysilane and organic compound, said partially hydrolyzed silicon compounds containing said partially hydrolyzed tetraalkoxysilane (calculated as $SiO_2$) and said partially hydrolyzed organic silicon compound (calculated as $R_n^2SiO_m$ wherein $m=(4-n)/2$) in the ratio of 5/95 to 95/5 by weight, and the weight (100 parts by weight) of said partially hydrolyzed silicon compounds being also calculated as $SiO_2$ for said partially hydrolyzed tetraalkoxysilane and as $R_n^2SiO_m$ for said partially hydrolyzed organic silicon compound, (B) 10 to 400 parts by weight of at least one member selected from a copolymer of an alkyl acrylate and/or an alkyl methacrylate (hereinafter, referred to as "alkyl (meth)acrylate") and a hydroxyalkyl acryate and/or a hydroxyalkyl methacrylate (hereinafter, referred to as "hydroxyalkyl (meth)acrylate"), which copolymer is, hereinafter, referred to as "acrylic copolymer-I"; a copolymer of at least one of an N,N-dialkylaminoalkyl acrylate and an N,N-dialkylaminoalkyl methacrylate (hereinafter, referred to as "N,N-dialkylaminoalkyl (meth)acrylate") and an N,N-dialkylacrylamide and an N,N-dialkylmethacrylamide (hereinafter, referred to as "N,N-dialkyl(meth)acrylamide") and at least one of a hydroxyalkyl (meth)acrylate and an alkyl (meth)acrylate, which copolymer is, hereinafter, referred to as "acrylic copolymer-II"; and a monomer or oligomer having two or more hydroxy groups (hereinafter, referred to as "polyol"), and (C) 0 to 300 parts by weight of an etherified methylomelamine, provided that when the component (B) is the polyol, said etherified methylolmelamine is contained in an amount of 0.5 to 1.5 gram equivalent per 1 gram equivalent of the polyol within 300 parts by weight, wherein these components (A), (B) and (C) are dissolved in a solvent. This coating composition may occasionally be referred to as "top coating composition", or "silicic coating composition".

The coating composition is applied to the surface of various products, such as plastics products, wooden products, metallic products, or the like, and thereby, an excellent surface hardness is given thereto.

When the coating composition is applied, an under coat layer may previously be formed onto the products. A composition useful for the under coat comprises:

(1) a polymer (I) having a repeating structural unit of the formula:

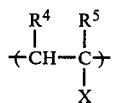

wherein $R^4$ and $R^5$ are each hydrogen, a lower alkyl having 1 to 5 carbon atoms, or carboxyl group, and X is a side chain containing carboxyl or amino group, or (2) a polymer (II) having a repeating structural unit of the formula:

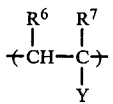

wherein $R^6$ and $R^7$ are each hydrogen, a lower alkyl having 1 to 5 carbon atoms or carboxyl group, and Y is a side chain containing hydroxy group, and a repeating structural unit of the formula:

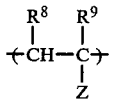

wherein $R^8$ and $R^9$ are each hydrogen, a lower alkyl having 1 to 5 carbon atoms, or carboxyl group, and Z is a side chain containing carboxyl, amino, a substituted amino, epoxy or tetrahydrofuryl group.

When the under coating composition and subsequent top coating composition are applied and then baked, there is obtained a coated product having an improved abrasion resistance and an improved adhesion with the base material.

Suitable examples of the tetraalkoxysilane contained in the component (A) of the present top coating composition are the compounds of the formula: $Si(OR^1)_4$ wherein the alkoxy group: $-OR^1$ is methoxy, ethoxy, propoxy or butoxy. Suitable examples of the organic silicon compound contained in the component (A) are the compounds of the formula: $R_n^2Si(OR^3)_{4-n}$ wherein the hydrocarbon group: $R^2$ is methyl, ethyl, propyl butyl, pentyl, hexyl, vinyl, allyl or phenyl, and the alkyl group: $R^3$ is methyl, ethyl, propyl or butyl.

The co-partial hydrolyzates or each partial hydrolyzate of the tetraalkoxysilane and the organic silicon compound may be obtained by hydrolyzing them either separately or together in a solvent, such as a mixed solvent of water and an alcohol, in the presence of an acid (e.g. hydrochloric, phosphoric and sulfuric acid, oxalic and maleic acid, acetic and formic acid). Alternatively, the partially hydrolyzed silicon compounds may be produced by hydrolyzing directly a silicon chloride or mixed chloride (e.g. $SiCl_4$ or $R_nSiCl_{4-n}$). Generally speaking, it is more preferable to cohydrolyze the mixture of the silicon compounds rather than hydrolyzing separately each of the silicon compounds and mixing the resultants. The partial hydrolyzed silicon compounds thus obtained contain the partial hydrolyzate of the tetraalkoxysilane (calculated as $SiO_2$) and the partial hydrolyzate of the organic silicon compound (calculated as $R_n^2SiO_m$ wherein m is $(4-n)/2$) in the ratio of 5/95 to 95/5 by weight, preferably 30/70 to 80/20 by weight. When the partial hydrolyzate of the tetraalkoxysilane is contained in an amount of less than 5% by weight, the coating film formed from the coating composition has a lower hardness and loses abrasion resistance which can not be practically used, and on the other hand, when the amount is over 95% by weight, the coating film has a lower flexibility and cracks tend to occur.

The acrylic copolymer-I used as the component (B) in the present coating composition may be obtained by subjecting an alkyl (meth)acrylate and a hydroxyalkyl (meth)acrylate to a bulk polymerization, emulsion polymerization, suspension polymerization or solution polymerization in the presence of a radical polymerization initiator, such as azobisisobutyronitrile, benzoyl peroxide, di-tert-butyl peroxide, or the like. Alkyl (meth)acrylate includes esters of (meth)acrylic acid with an alcohol having from 1 to 18 carbon atoms, for example, ethyl (meth)acrylate, propyl (meth)acrylate, butyl (meth)acrylate, lauryl (meth)acrylate, or the like. Hydroxyalkyl (meth)acrylate includes, for example, 2-hydroxyethyl (meth)acrylate, hydroxypropyl (meth)acrylate, hydroxybutyl (meth)acrylate, glycerol mono(meth)acrylate, or the like. The ratio of the total weight of at least one alkyl (meth)acrylate and the total weight of at least one hydroxyalkyl (meth)acrylate, which are contained in the acrylic copolymer-I, is not critical, but from the standpoint of the adhesion between the coating film and the under coating layer and the flexibility of the coating film, the ratio thereof may preferably be in the range of 10/90 to 90/10 by weight.

The acrylic copolymer-II may be obtained by subjecting one or more of an N,N-dialkylaminoalkyl (meth)acrylate and an N,N-dialkyl(meth)acrylamide and one or more of a hydroxyalkyl (meth)acrylate and an alkyl (meth)acrylate to a bulk polymerization, emulsion polymerization, suspension polymerization or solution polymerization in the presence of a radical polymerization initiator, such as azobisisobutyronitrile, benzoyl peroxide, di-tert-butyl peroxide, or the like.

The N,N-dialkylaminoalkyl (meth)acrylate includes 2-N,N-dimethylamino)ethyl (meth)acrylate, 2-(N,N-diethylamino)ethyl (meth)acrylate, 3-(N,N-diethylamino)propyl (meth)acrylate, or the like.

The N,N-dialkyl(meth)acrylamide includes N,N-dimethyl(meth)acrylamide, N,N-diethyl(meth)acrylamide, N,N-dibutyl(meth)acrylamide, or the like.

The hydroxyalkyl (meth)acrylate includes 2-hydroxyethyl (meth)acrylate, hydroxypropyl (meth)acrylate, hydroxybutyl (meth)acrylate, glycerol mono(meth)acrylate, polyethyleneglycol mono(meth)acrylate, or the like.

The alkyl (meth)acrylate includes methyl (meth)acrylate, ethyl (meth)acrylate, propyl (meth)acrylate, butyl (meth)acrylate, 2-ethylhexyl (meth)acrylate, lauryl (meth)acrylate, or the like.

The ratio of the total weight of one or more of the N,N-dialkylaminoalkyl (meth)acrylate and N,N-dialkyl(meth)acrylamide and the total weight of one or more of the hydroxyalkyl (meth)acrylate and alkyl (meth)acrylate, which are contained in the acrylic copolymer-II, is not critical, but from the standpoint of the adhesion between the coating film and the under coating layer and the flexibility of the coating film, the ratio thereof may preferably be in the range of 95/5 to 10/90.

Polyols used in the present invention include ethylene glycol, diethylene glycol, triethylene glycol, propylene glycol, dipropylene glycol, 1,3-propanediol, (1,3-, 1,4- or 2,3-)butanediol, 1,6-hexanediol, 1,8-octanediol, 1,10-decanediol, neopentyl glycol, pentaerythritol, glycerin, sorbitol, and polyethylene glycol, polypropylene glycol and ethylene glycol-propylene glycol copolymer which have a molecular weight of less than 500. When a polyol having a molecular weight of 500 or more is used, the coating film tends to show a lower surface hardness and abrasion resistance, while the flexibility thereof is increased.

One or more members selected from the above acrylic copolymer-I, acrylic copolymer-II and polyol are incorporated together with the silicon component into the present top coating composition.

In the top coating composition, the total amount of the component (B) consisting essentially of one or more members selected from the acrylic copolymer-I, acrylic copolymer-II and polyol is in the range of 10 to 400 parts by weight, preferably 20 to 250 parts by weight, per 100 parts by weight of the component (A) wherein the weight of the partially hydrolyzed tetraalkoxysilane is calculated as $SiO_2$ and the weight of the partially hydrolyzed organic silicon compound is calculated as $R_n^2SiO_m$. When the amount of the component (B) is smaller than 10 parts by weight, the coating film obtained therefrom has an inferior adhesion and also a lower flexibility which results in the occurrence of cracks, and on the other hand, when the amount of the component (B) is over 400 parts by weight, the coating film has an inferior hardness.

In order to give both excellent hardness and excellent flexibility to the coating film, it is preferable to use an etherified methylolmelamine [the component (C)] in addition to the acrylic copolymer-I, acrylic copolymer-II and polyol.

The etherified methylolmelamine includes any known compounds which are disclosed in many literatures and some of them are commercially available. Suitable examples of the etherified methylolmelamine are hexamethylolmelamine, pentamethylolmelamine, tetramethylolmelamine, a part or whole of the methylol groups of which may be methylated, ethylated, propylated or butylated. Particularly suitable examples are a hexa(alkoxymethyl)melamine, such as hexa(methoxymethyl)melamine, hexa(ethoxymethyl)melamine, hexa(propoxymethyl)melamine, hexa(isopropoxymethyl)melamine, hexa(butoxymethyl)melamine, or hexa(cyclohexyloxymethyl)melamine.

These etherified methylolmelamines are used alone or in a combination of two or more thereof in an amount of 0 to 300 parts by weight per 100 parts by weight of the component (A) (calculated as $SiO_2$ and $R_n^2SiO_m$). When the amount of the etherified methylolmelamine is over 300 parts by weight, the coating film has an inferior hardness and a lower adhesion after being dipped in hot water and subjected to a test of weatherability. When the polyol is used as the component (B), it is essential to use the etherified methylolmelamine. When the polyol is used in an amount in excess to that of the etherified methylolmelamine, the unreacted polyol remains in the coating film, which results in a lower hardness and durability of the coating film, and on the other hand, when the amount of the polyol is too small, the coating film loses the flexibility and cracks tend to occur.

The etherified methylolmelamine is mixed with the polyol in the ratio of 1:0.5–1.5 by gram equivalent, preferably 1:0.8–1.2 by gram equivalent (etherified methylolmelamine:polyol). In order to give both hardness and flexibility to the coating film and to regulate the viscosity of the coating liquid, it is more preferable to previously pre-condensate the etherified methylolmelamine and the polyol and then add the resulting pre-condensate to the component (A), rather than to add them to the component (A) separately.

The present inventors have also found that the amount of the partial hydrolyzate of tetraalkoxysilane contained in the coating composition used for top coating is largely effective for the hardness of the top coating film. When the amount of the partial hydrolyzate of tetraalkoxysilane is larger, the coating film has a large hardness and an improved abrasion resistance, but has an inferior flexibility and cracks tend to occur. When the amount of the partial hydrolyzate of tetraalkoxysilane is small the coating film has a small hardness and an inferior abrasion resistance. When the polyol is used as the component (B), the amount of the partial hydrolyzate of tetraalkoxysilane (calculated as $SiO_2$) is preferably in the range of 6 to 45% by weight based upon the total weight of the solid components in the top coating composition.

The solvent used in the preparation of the top coating composition includes alcohols, ketones, esters, ethers, cellosolves, halogenated compounds, carboxylic acids, aromatic compounds, or the like, which may be used alone or in a combination of two or more thereof. Particularly suitable examples of the solvent are lower alcohols (e.g. methanol, ethanol, propanol or butanol), cellosolves (e.g. methyl cellosolve, ethyl cellosolve or butyl cellosolve), lower aliphatic carboxylic acids (e.g. formic acid, acetic acid or propionic acid), aromatic compounds (e.g. toluene or xylene), esters (e.g. ethyl acetate or butyl acetate), or the like, which may be used alone or as a mixed solvent. The solvent is used so that the solids content of the coating composition achieves a concentration of 5 to 50% by weight.

The top coating composition is applied to the base material, to which an under coating composition as mentioned hereinafter is previously applied and followed by baking. After top coating, the resultant is heated at a temperature higher than 70° C. but lower than the heat deformation temperature of the base material (in case of a polycarbonate resin, the heat deformation temperature being in the range of 120° to 160° C.) for 10 to 200 minutes and thereby the coating composition is cured to give a coating film having excellent hardness and adhesion. In order to lower the curing temperature or to shorten the curing time, it is preferable to use a curing accelerator, such as acids (e.g. hydrochloric acid, phosphoric acid or toluenesulfonic acid), ammonium salts (e.g. ammonium chloride, ammonium nitrate or ammonium thiocyanate), organic amines, metal salts of organic carboxylic acids, metal salts of thiocyanic acid, metal salts of nitrous acids, metal salts of boric acid, organic tin compounds, or the like. Optionally, a commercially available flow-controlling agent, such as an alkylene oxide-dimethylsiloxane block copolymer (e.g. NUC Silicone Y7006, a trade name of Nippon Unicar Co.) may also be used. The curing accelerator and flow-controlling agent may be used in a small amount, and usually, the curing accelerator may be used in an amount of 0.1 to 5% by weight based on the weight of solid components in the coating composition and the flow-controlling agent may be used in an amount of 0.01 to 0.1% by weight based on the total weight of the coating composition.

The top coating is carried out by a conventional coating method, such as dipping, spray coating, roller coating or flow coating, and after coating, the resultant is cured by heating at 70° C. or higher to give a coating film having excellent hardness, flexibility and chemical resistance. The thickness of the top coating layer (after curing) is preferably in the range of 3 to 50 microns, more preferably 5 to 20 microns.

In order to increase the adhesion between the top coating layer and the base material, it is preferable to previously apply an under coating composition to the base material.

The under coating composition comprises the polymer (I) or the polymer (II) as mentioned hereinbefore. The polymer (I) contains at least 5% by mol, preferably 20 to 100% by mol, of the repeating structural unit of the formula (I), and the polymer (II) contains at least 2.5% by mol, preferably 10 to 90% by mol, of each repeating structural unit of the formula (II) and the formula (III).

The copolymer (I) may be prepared by polymerizing a vinyl monomer (A) as mentioned hereinafter alone or by copolymerizing the vinyl monomer (A) and another monomer which is copolymerizable with the vinyl monomer (A) by a conventional polymerization method.

Suitable examples of the vinyl monomer (A) are acrylic acid, methacrylic acid, crotonic acid, vinylacetic acid, maleic acid, itaconic acid, aminomethyl acrylate, aminomethyl methacrylate, acrylamide, methacrylamide, crotonamide, or the like, which may be used alone or in a mixture of two or more thereof.

The other monomer copolymerizable with the vinyl monomer (A) or the vinyl monomers (B) and (C) as mentioned hereinafter includes any compound having at least one ethylenically unsaturated bond in the molecule, for example, olefins (e.g. ethylene), diolefins (e.g. butadiene), vinyl compounds (e.g. vinyl chloride, vinylidene chloride or acrylonitrile, acrylic or methacrylic acid esters (e.g. methyl (meth)acrylate, ethyl (meth)acrylate), (meth)acrylamides (e.g. N,N-dimethyl(meth)acrylamide), or the like, which may be used alone or in a combination of two or more thereof.

Suitable example of the polymer (I) is a copolymer comprising 90 to 5% by weight of one or more amino monomers selected from the group consisting of an N,N-dialkylaminoalkyl (meth)acrylate and an N,N-dialkyl(meth)acrylamide, 10 to 50% by weight of methyl methacrylate and 0 to 85% by weight of at least one vinyl compound copolymerizable with these monomers, and this copolymer is particularly useful when the base material to be coated is a polycarbonate resin article.

Besides, the polymer (II) may be prepared by copolymerizing the vinyl monomer (B) and the vinyl monomer (C) as mentioned hereinafter, optionally together with other monomers copolymerizable with these vinyl monomers (B) and (C) as mentioned hereinbefore by a conventional polymerization method.

Suitable examples of the vinyl monomer (B) are allyl alcohol, N-hydroxymethylacrylamide, N-hydroxymethylmethacrylamide, N-(2-hydroxyethyl)acrylamide, N,N-dihydroxymethylacrylamide, N,N-di(2-hydroxyethyl)methacrylamide, 2-hydroxyethyl acrylate, 2-hydroxyethyl methacrylate, 2-hydroxypropyl acrylate, 2-hydroxypropyl methacrylate, 1,4-butylene glycol monoacrylate, 1,4-butylene glycol monomethacrylate, glycerol monomethacrylate, hydroxyallyl methacrylate, polyethylene glycol monoacrylate, polypropylene glycol monomethacrylate, hydroxymethylaminomethyl acrylate, hydroxymethylaminomethyl methacrylate, 2-hydroxyethylaminomethyl acrylate, 2-(2'-hydroxyethylamino)ethyl methacrylate, N,N-di(hydroxymethyl)aminomethyl acrylate, N,N-di(hydroxymethyl)aminoethyl methacrylate, N,N-di(2-hydroxyethyl)aminomethyl acrylate, or the like, which may be used alone or in a combination of two or more thereof.

Suitable examples of the vinyl monomer (C) are acrylic acid, methacrylic acid, crotonic acid, vinylacetic acid, maleic acid, itaconic acid, acrylamide, methacrylamide, crotonamide, N-methylacrylamide, N-methylmethacrylamide, N-ethylacrylamide, N-ethylmethacrylamide, N-propylacrylamide, N-butylacrylamide, N-tert-butylmethacrylamide, N,N-dimethylacrylamide, N,N-dimethylmethacrylamide, N,N-diethylacrylamide, N,N-diethylmethacrylamide, N,N-dipropylmethacrylamide, N,N-dibutylacrylamide, N,N-dibutylmethacrylamide, N-butoxymethylacrylamide, N-iso-butoxymethylmethacrylamide, 2-(N-methylamino)ethyl acrylate, 2-(diethylamino)ethyl methacrylate, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N,N-dibutylamino)ethyl acrylate, 2-(N,N-dibutylamino)ethyl methacrylate, 3-(N,N-diethylamino)propyl acrylate, 3-(N,N-diethylamino)propyl methacrylate, 2-(N,N-dibutylamino)propyl acrylate, 2-(N,N-dibutylamino)propyl methacrylate, 3-(N,N-dibutylamino)propyl methacrylate, allyl glycidyl ether, glycidyl acrylate, glycidyl methacrylate, glycidyl crotonate, tetrahydrofurfuryl acrylate, tetrahydrofurfuryl methacrylate, or the like, which may be used alone or in a combination of two or more thereof.

It is not necessarily required to incorporate a crosslinking agent into the under coating composition. However, when the top coating composition is applied to the base material coated with the under coating composition, the organic solvent contained in the top coating composition occasionally corrodes the under coat layer, which results in lowering of the adhesion of the coating film to the base material. In order to prevent such a corrosion of the under coat with the solvent, it is preferable to incorporate a crosslinking agent into the under coating composition. The crosslinking agent includes an alkyleneglycol di(meth)acrylate, an alkyl-etherified methylolmelamine, a polyalkyleneglycol di(meth)acrylate, pentaerythritol diacrylate, or the like. Among them, hexa(methoxymethyl)melamine and hexa(butoxymethyl)melamine are particularly preferable. These crosslinking agents may be used alone or in a combination of two or more thereof. The crosslinking agent may be used in an amount of 0.05 to 0.7 equivalent, preferably 0.2 to 0.4 equivalent, per 1 equivalent of the functional group contained in the polymer (I) or polymer (II) such as carboxyl, amino, substituted amino, hydroxy, epoxy or tetrahydrofuryl.

A crosslinking catalyst is used together with the crosslinking agent. Suitable examples of the crosslinking catalyst are hydrochloric acid, ammonium chloride, ammonium nitrate, ammonium thiocyanate, or the like. The crosslinking catalyst may preferably be used in an amount of 0.05 to 0.8 gram equivalent per 1 gram equivalent of the crosslinking agent.

The under coating composition is usually diluted with a diluent to a concentration suitable for application thereof, when used. Examples of the diluent are alcohols (e.g. methanol, ethanol), ethers (e.g. methyl cellosolve), ketones (e.g. methyl ethyl ketone), esters (e.g. methyl acetate, ethyl acetate), or the like, which may be used alone or in the form of a mixed solvent of two or more thereof. Suitable concentration of the under coating composition after dilution is in the range of 0.1 to 10% by weight, preferably 0.5 to 5% by weight, of the content of the polymer (I) or the polymer (II).

The under coating composition may optionally contain a small amount of a conventional additive, such as a flow-controlling agent.

The under coating composition containing the polymer (I) or the polymer (II) as the main ingredient and optionally a crosslinking agent, a crosslinking catalyst, a diluent and a flow-controlling agent is applied to the surface of a base material by a conventional coating method, such as dipping, spray coating, roller coating or flow coating, and the resultant is dried and further optionally cured by heating at a temperature lower than the heat deformation temperature of the base material to give an under coating film. The under coating film may preferably have a thickness of 0.1 to 1 micron. When the top coating composition is applied to the under-coated base material, the functional groups such as hydroxyl, carboxyl or amino groups contained in the under coating film are reacted with the silicon components contained in the top coating composition, and thereby, the top coating film is strongly adhered to the base material via the under coating film.

The base material to be coated with the present coating composition includes plastic resins (e.g. polycarbonate resin, polymethyl methacrylate resin, polystyrene resin or polyvinyl chloride resin), metallized products which are produced by depositing a metal (e.g. aluminum) onto a resin sheet (e.g. a polymethyl methacrylate sheet), plated products which are produced by plating a metal (e.g. chromium) onto a resin (e.g. ABS resin), metals (e.g. aluminum or iron), coated products of plastics or metals, or the like. Since the components of the under coating composition and the top coating composition of the present invention have an excellent transparency, these compositions are particularly useful for coating a clear plastic such as a polycarbonate base material and for finishing the surface of metallized products or plated products in order to give them an excellent abrasion resistance.

Particularly suitable base materials are polycarbonate resins, for example, bisphenol type polycarbonate (e.g. 4,4'-isopropylidenediphenol polycarbonate), polycarbonates disclosed in U.S. Pat. No. 3,305,520 and Crystofer and Fox, "Polycarbonates", pages 161–176 (1962), diethylene glycol bisallylcarbonate, or the like.

The present invention is illustrated by the following Examples, but is not limited thereto. In the Examples, "%" and "part" mean % by weight and part by weight unless specified otherwise.

EXAMPLES 1 to 11 and Reference Examples 1 to 4

(1) Preparation of a solution of cohydrolyzation products of tetraethoxysilane and methyltriethoxysilane (Component I):

Tetraethoxysilane (66.7 g) and methyltriethoxysilane (33.3 g) were dissolved in isopropyl alcohol (70 g) and 0.05 N hydrochloric acid (30 g) was added to the solution, and the mixture was stirred at room temperature to effect hydrolysis. After the reaction, the mixture was matured at room temperature for 20 hours or more. The resulting solution contained a partial hydrolyzate of tetraethoxysilane (9.6%, calculated as $SiO_2$) and a partial hydrolyzate of methyltriethoxysilane (6.3%, calculated as $CH_3SiO_{1.5}$) ($SiO_2:CH_3SiO_{1.5}=60:40$).

(2) Preparation of a solution of cohydrolyzation products of tetraethoxysilane and methyltriethoxysilane (Component II):

A reactor provided with a reflux condenser was charged with isopropyl alcohol (68 g), tetraethoxysilane (38 g) and methyltriethoxysilane (72 g). To the mixture was added 0.05 N hydrochloric acid (36 g), and the mixture was heated with stirring at a reflux temperature for 5 hours to effect hydrolysis. After the reaction, the reaction mixture was cooled to room temperature to give a cohydrolyzation solution which contained a partial hydrolyzate of tetraethoxysilane (5.1%, calculated as $SiO_2$) and a partial hydrolyzate of methyltriethoxysilane (12.6%, calculated as $CH_3SiO_{1.5}$) ($SiO_2:CH_3SiO_{1.5}=29:71$).

(3) Preparation of a solution of cohydrolyzation products of tetraethoxysilane and dimethyldiethoxysilane (Component III):

Tetraethoxysilane (83.3 g) and dimethyldiethoxysilane (16.7 g) were dissolved in isopropyl alcohol (70 g) and 0.05 N hydrochloric acid (30 g) was added to the solution and the mixture was stirred at room temperature to effect hydrolysis. After the reaction, the mixture was matured at room temperature for 20 hours or more. The resulting solution contained a partial hydrolyzate of tetraethoxysilane (12%, calculated as $SiO_2$) and a partial hydrolyzate of dimethyldiethoxysilane (4.2%, calculated as $(CH_3)_2SiO$) ($SiO_2:(CH_3)_2SiO=74:26$).

(4) Preparation of a solution of cohydrolyzation products of tetraethoxysilane, methyltriethoxysilane and trimethylethoxysilane (Component IV):

Tetraethoxysilane (83.3 g), methyltriethoxysilane (14 g) and trimethylethoxysilane (2.7 g) were dissolved in ethyl alcohol (70 g) and 0.05 N hydrochloric acid (30 g) was added to the solution, and the mixture was stirred at room temperature to effect hydrolysis. After the reaction, the resulting mixture was matured at room temperature for 20 hours or more. The resulting solution contained a partial hydrolyzate of tetraethoxysilane (12%, calculated as $SiO_2$), a partial hydrolyzate of methyltriethoxysilane (2.6%, calculated as $CH_3SiO_{1.5}$) and a partial hydrolyzate of trimethylethoxysilane (0.9%, calculated as $(CH_3)_3SiO_{0.5}$) [$SiO_2:(CH_3SiO_{1.5}+(CH_3)_3SiO_{0.5})=77:23$].

(5) Preparation of a solution of cohydrolyzation products of tetraethoxysilane and methyltriethoxysilane (Component V):

Tetraethoxysilane (88 g) and methyltriethoxysilane (16 g) were dissolved in isopropyl alcohol (60 g) and 0.05 N hydrochloric acid (36 g) was added to the solution, and the mixture was stirred at room temperature to effect hydrolysis. After the reaction, the mixture was matured at room temperature for 20 hours or more. The resulting solution contained a partial hydrolyzate tetraethoxysilane (12.8%, calculated as $SiO_2$) and a partial hydrolyzate of methyltriethoxysilane (3.0%, calculated as $CH_3SiO_{1.5}$) ($SiO_2:CH_3SiO_{1.5}=81:19$).

(6) Preparation of acrylic copolymer-I:

(a) Butyl acrylate (40 g), 2-hydroxyethyl methacrylate (10 g) and azobisisobutyronitrile (0.5 g) were dissolved in ethyl alcohol (300 g). The mixture was stirred at 70° C. for 5 hours under nitrogen gas to effect polymerization. After the reaction was completed, the reaction mixture was poured into petroleum ether and thereby the unreacted monomer was removed to give Copolymer (a).

(b) Ethyl acrylate (50 g) and 3-hydroxypropyl methacrylate (10 g) were copolymerized in the same manner as described in the above (a) to give Copolymer (b).

(7) Preparation of acrylic copolymer-II:

(c) 2-(N,N-Dimethylamino)ethyl methacrylate (4 g), 2-hydroxyethyl methacrylate (2 g), butyl acrylate (14 g) and benzoyl peroxide (0.2 g) were dissolved in ethyl cellosolve (80 g). The mixture was stirred at 85° C. for 4 hours and further at 100° C. for 30 minutes under nitrogen gas to give a solution of Copolymer (c).

(d) N,N-Dimethylacrylamide (4 g), 2-hydroxyethyl methacrylate (2 g) and butyl acrylate (14 g) were copolymerized in the same manner as described in the above (c) to give a solution of Copolymer (d).

(8) Preparation of a solution of each pre-condensate of hexa(methoxymethyl)melamine and 1,4-butanediol, 1,6-hexanediol, diethylene glycol, triethylene glycol or tetraethylene glycol:

(a) An 85% phosphoric acid (0.2 ml) was added to hexa(methoxymethyl)melamine (78 g) and 1,4-butanediol (54 g) (gram equivalent ratio=1:1), and the mixture was reacted at 130°–140° C. to give a prepolymer having a molecular weight of about 5,000. To the reaction product was added ethyl cellosolve to give Pre-condensate Solution (a) having a solid content of 75%.

(b) Hexa(methoxymethyl)melamine (78 g) and 1,6-hexanediol (71 g) (gram equivalent ratio=1:1) were condensed in the same manner as described in the above (a) to give Pre-condensate Solution (b) having a solid content of 96%.

(c) Hexa(methoxymethyl)melamine (65 g) and diethylene glycol (53 g) (gram equivalent ratio=1:1) were reacted likewise to give a prepolymer having a molecular weight of about 30,000. To the prepolymer was added ethyl cellosolve to give Pre-condensate Solution (c) having a solid content of 96%.

(d) An 85% phosphoric acid (0.2 ml) was added to hexa(methoxymethyl)melamine (260 g) and triethylene glycol (300 g) (gram equivalent ratio=1:1). The mixture was reacted at 130°–140° C. until 42.7 g of a distillate were obtained. To the prepolymer thus obtained was added ethyl cellosolve to give Pre-condensate Solution (d) having a solid content of 96%.

(e) An 85% phosphoric acid (0.4 ml) was added to hexa(methoxymethyl)melamine (520 g) and tetraethylene glycol (800 g) (gram equivalent ratio=1:1). The mixture was reacted at 130°–140° C. until 86 g of a distillate were obtained. To the prepolymer thus obtained was added ethyl cellosolve to give Pre-condensate Solution (e) having a solid content of 96%.

(9) Preparation of the coating composition:

To the solution of Component I, Component II and Component V were added hexa(methoxymethyl)melamine and polyol or a pre-condensate thereof, a curing accelerator, a flow-controlling agent, etc. To the mixture was added ethyl cellosolve so that the solid content becomes 10 to 40% to give the coating compositions as shown in Table 1.

(10) Coating and tests of the properties of the coated products:

Polycarbonate sheet (thickness: 3 mm) was washed and coated with the above-obtained coating compositions. The coated products were cured with a hot-air drier at 130° C. for 2 hours. The polycarbonate sheets thus coated were subjectd to the following tests:

(i) Adhesion:

This was tested by the so-called "cross-cut tape test". That is, the coating film was cross-cut by making each 11 parallel lines of nicks with a knife in an interval of 1 mm in the horizontal and vertical directions so that a hundred cells having an area of 1 $mm^2$ were formed, and thereon was bonded an adhesive cellophane tape. The cellophane tape was then peeled off. The adhesion of the coating film was evaluated by the number of the remaining cells.

(ii) Abrasion resistance:

Steel wool test: the surface was rubbed with #0000 steel wool. The abrasion resistance was evaluated according to the following scale.

A: No scratch made on the surface even by strong rubbing.

B: A few scratches made by strong rubbing.

C: Scratches made even by weak rubbing.

Taber abrasion test: It was tested in accordance with ASTM D-1044 by using a Taber abrader (wheel: CS-10F, load: 500 g). The abrasion resistance was evaluated by a haze (%) after rotating the wheel 500 times.

(iii) Boiling water resistance:

The surfaces to be tested were immersed in boiling water for 60 minutes, and thereafter, the state of the coating film was observed.

(iv) Flexibility:

A sample (50 mm × 100 mm × thickness 0.7 mm) was bent in a bending radius of 15 mm at room temperature. The flexibility was evaluated by the occurrence of cracks.

(v) Heat cycle test:

A sample was kept in turn at −20° C. and at 80° C. for each 2 hours. This was repeated ten times, and thereafter, the state of the coating film was observed.

These test results are shown in Table 2.

TABLE 1

| | Component A | | | Components B and C | | | |
| | I (Solid content 15.9%) Part by weight | II (Solid content 17.7%) Part by weight | V (Solid content 15.8%) Part by weight | Etherified methylolmelamine (Component C) Part by weight | Polyol (Component B) | | Pre-condensate Solution (Components B and C) | |
| Example No. | | | | | Kind | Part by weight | Kind | Part by weight |
| --- | --- | --- | --- | --- | --- | --- | --- | --- |
| Ex. 1 | 100 | — | — | 21 | 1,4-Butanediol | 14 | — | — |
| Ex. 2 | 100 | — | — | 9 | Glycerin | 4 | — | — |
| Ex. 3 | — | — | 100 | 11 | Neopentyl glycol | 9 | — | — |
| Ref. Ex. 1 | 100 | — | — | 35 | — | — | — | — |
| Ref. Ex. 2 | 100 | — | — | — | 1,4-Butanediol | 35 | — | — |
| Ex. 4 | 100 | — | — | — | — | — | a | 103 |
| Ex. 5 | — | 100 | — | — | — | — | a | 17 |

TABLE 1-continued

| | Component A | | | | Components B and C | | | |
|---|---|---|---|---|---|---|---|---|
| | I (Solid content 15.9%) Part by weight | II (Solid content 17.7%) Part by weight | V (Solid content 15.8%) Part by weight | Etherified methylolmelamine (Component C) Part by weight | Polyol (Component B) | | Pre-condensate Solution (Components B and C) | |
| Example No. | | | | | Kind | Part by weight | Kind | Part by weight |
| Ex. 6 | — | — | 100 | — | — | — | a | 38 |
| Ref. Ex. 3 | — | — | 100 | — | — | — | a | 1 |
| Ex. 7 | — | 100 | — | — | — | — | b | 9 |
| Ex. 8 | — | — | 100 | — | — | — | b | 20 |
| Ref. Ex. 4 | — | 100 | — | — | — | — | b | 101 |
| Ex. 9 | 100 | — | — | — | — | — | c | 17 |
| Ex. 10 | 100 | — | — | — | — | — | d | 17 |
| Ex. 11 | 100 | — | — | — | — | — | e | 17 |

[Note]:
(1) Etherified methylolmelamine is hexa(methoxymethyl)melamine.
(2) The Pre-condensate Solution (a) has a solid content of 75%, and the Pre-condensate Solution(b), (c), (d) and (e) have a solid content of 96%.

TABLE 2

| | Properties | | | | | | |
|---|---|---|---|---|---|---|---|
| | Appearance after curing | Adhesion | Abrasion resistance | | Boiling water resistance | Flexibility | Heat cycle test |
| Example No. | | | Steel wool test | Taber test (Haze: %) | | | |
| Ex. 1 | Good | 100/100 | A | 29 | Good | Yes | Good |
| Ex. 2 | " | " | A | 18 | " | " | " |
| Ex. 3 | " | " | A | 15 | " | " | " |
| Ref. Ex. 1 | Crack | " | A | 22 | Increased crack | No | Increased crack |
| Ref. Ex. 2 | " | " | A | 30 | " | " | " |
| Ex. 4 | Good | " | B | 35 | Good | Yes | Good |
| Ex. 5 | " | " | A | 30 | " | " | " |
| Ex. 6 | " | " | A | 13 | " | " | " |
| Ref. Ex. 3 | Crack | " | A | 5 | Increased crack | No | Increased crack |
| Ex. 7 | Good | " | A | 28 | Good | Yes | Good |
| Ex. 8 | " | " | A | 7 | " | " | " |
| Ref. Ex. 4 | " | " | C | 42 | " | " | " |
| Ex. 9 | " | " | A | 20 | " | " | " |
| Ex. 10 | " | " | A | 18 | " | " | " |
| Ex. 11 | " | " | B | 23 | " | " | " |

EXAMPLE 12

To a mixture of ethyl cellosolve (320 g), 2-hydroxyethyl methacrylate (36 g) and dimethylaminoethyl methacrylate (44 g) was added azobisisobutyronitrile (0.4 g), and the mixture was reacted at 90° C. to give a solution of a copolymer of 2-hydroxyethyl methacrylate and dimethylaminoethyl methacrylate.

To the silicon Component I (100 parts) were added the copolymer solution obtained above (40 parts), Pre-condensate Solution (a) (10 pars), a curing accelerator and a flow-controlling agent to give a coating composition. The coating composition thus obtained was applied to a previously washed polycarbonate sheet (thickness: 3 mm). The coated product was cured with a hot-air drier at 130° C. for 2 hours. The coating film thus prepared showed steel wool test: A, and excellent boiling water resistance and flexibility.

In the following Examples 13 to 35 and Reference Examples 5 to 11, the Components I to V, Copolymers (a) to (d) and Pre-condensate Solutions (a) to (e) as prepared in the above Examples 1 to 11 were used. Besides, the under coating compositions were prepared as follows:

(a) 2-Hydroxyethyl methacrylate (76 g), dimethylaminoethyl methacrylate (4 g) and azobisisobutyronitrile (0.4 g) were dissolved in ethyl cellosolve (320 g), and the mixture was stirred at 90° C. for 4 hours under nitrogen gas to effect copolymerization. To the resulting solution (100 g) were added hexa(methoxymethyl)melamine (2.8 g), ammonium chloride (0.18 g), ethyl cellosolve (900 g) and a small amount of a flow-controlling agent to give Under Coating Composition (a).

(b) 2-Hydroxyethyl methacrylate (36 g), dimethylaminoethyl methacrylate (14 g), methyl methacrylate (50 g) and azobisisobutyronitrile (0.4 g) were dissolved in ethyl cellosolve (320 g), and the mixture was stirred at 90° C. for 4 hours under nitrogen gas to effect copolymerization. To the resulting solution (100 g) were added hexa(methoxymethyl)melamine (1.3 g), ammonium chloride (0.18 g), ethyl cellosolve (900 g) and a small amount of a flow-controlling agent to give Under Coating Composition (b).

EXAMPLES 13 to 17 and Reference Examples 5 to 8

A previously washed polycarbonate sheet was coated with the above Under Coating Composition (a) except Reference Example 8. The coated products were cured with a hot-air drier at 130° C. for 10 minutes to give under coating films having a thickness of about 0.5 micron.

A solution of Component I, Component II, Component III or Component IV, Copolymer (a) or Copolymer (b), and optionally hexa(butoxymethyl)melamine, a curing accelerator and a flow-controlling agent were mixed in the ratio as shown in Table 3. The mixtures were dissolved in a mixture of n-butanol (60 parts), acetic acid (40 parts) and xylene (20 parts) to give coating compositions.

The coating compositions obtained above were applied to under-coated polycarbonate sheets, except Reference Example 8, and the resulting products were cured with a hot-air drier at 130° C. for 2 hours to give top coating films having a thickness of about 10 micron. The coating films thus obtained were subjected to various tests, and the properties of the coating films are shown in Table 4. In these tests, adhesion and abrasion resistance were tested in the same manner as described in Examples 1 to 11. The boiling water resistance was tested by immersing the surfaces to be tested in hot water at 80° C. for 2 hours and thereafter observing the state of the coating film. The heat cycle test was carried out by immersing in turn a sample into boiling water at 80° C. for 10 seconds and ice-salt water at −° C. for 10 seconds (this being repeated ten times) and then observing the state of the coating film.

In these examples and reference examples, bisphenol type polycarbonate sheet and diethylene glycol bisallyl-carbonate sheet were used as the polycarbonate sheet. In both sheets, the same results were obtained.

EXAMPLES 18 to 21 and Reference Example 9

A solution of Component I, Copolymer (c) or Copolymer (d), and optionally methylated methylolmelamine and a curing accelerator (sodium acetate, 0.4 part) were mixed in the ratio as shown in Table 5. The mixture is dissolved in a mixture of isopropanol (20 parts), acetic acid (10 parts) and ethyl cellosolve (20 parts) to give coating compositions.

The coating compositions were applied to polycarbonate sheets which were previously washed and coated with Under Coating Composition (a) as in Examples 13-17. The coated products were cured with a hot-air drier at 130° C. for one hour. The coating films thus produced were subjected to various tests, and the properties of the coating films are shown in Table 5. In the tests, the boiling water resistance was tested by immersing the surfaces to be tested in boiling water at 60° C. for 30 minutes and thereafter observing the state of the coating film, and the other tests were done in the same manner as described in Examples 1 to 11.

TABLE 3

| Example No. | Under coating | Component (A) (100 parts by weight) | Component (B) (Acrylic copolymer-I) Kind | Part by weight | Component (C) [Hexa(butoxymethyl-melamine] Part by weight | Additives |
|---|---|---|---|---|---|---|
| Ex. 13 | Yes | I | a | 4 | 2 | U |
| Ex. 14 | " | II | a | 10 | 10 | — |
| Ex. 15 | " | III | a | 6 | — | V |
| Ref. Ex. 5 | " | I | — | — | — | U |
| Ref. Ex. 6 | " | III | — | — | — | V |
| Ex. 16 | " | IV | a | 20 | — | W |
| Ex. 17 | " | IV | b | 15 | 5 | " |
| Ref. Ex. 7 | " | IV | — | — | — | " |
| Ref. Ex. 8 | No | IV | — | — | — | " |

[Note]:
U: Sodium acetate (0.4 part)
V: Potassium thiocyanate (0.4 part) and NUC Silicone Y-7006 (a surfactant sold by Nippon Unicar Co.) (0.2 part)
W: Sodium acetate (0.4 part) and NUC Silicone Y-7006 (0.2 part)

TABLE 4

| Example No. | Appearance after curing | Adhesion | Abrasion resistance | Boiling water resistance | Heat cycle test |
|---|---|---|---|---|---|
| Ex. 13 | Good | 100/100 | A | Good | Good |
| Ex. 14 | " | " | B | " | " |
| Ex. 15 | " | " | A | " | " |
| Ref. Ex. 5 | Slight crack | " | A | Increased crack | Increased crack |
| Ref. Ex. 6 | Good | " | A | Good | Crack |
| Ex. 16 | " | " | A | " | Good |
| Ex. 17 | " | " | A | " | " |
| Ref. Ex. 7 | Slight crack | " | A | Increased crack | Increased crack |
| Ref. Ex. 8 | Good | 0/100 | * | Peeled off | Peeled off |

[Note]:
* Owing to the inferior adhesion, the coating film was peeled off by rubbing with the steel wool.

In these examples and reference examples, bisphenol type polycarbonate sheet and diethylene glycol bisallyl-carbonate sheet were used as the polycarbonate sheet. In both sheets, the same results were obtained.

TABLE 5

| Example No. | Component A (Solid content 15.9%) Part by weight | Component B (Copolymer solution) Kind* | Part by weight | Melamine** Part by weight | Before boiling water resistance Appearance | Adhesion | Abrasion resistance | After boiling water resistance test Appearance | Adhesion | Abrasion resistance |
|---|---|---|---|---|---|---|---|---|---|---|
| Ex. 18 | 100 | c | 50 | — | Good | 100/100 | A | Good | 100/100 | A |
| Ex. 19 | " | c | 10 | — | " | " | A | " | " | A |
| Ref. Ex. 9 | " | — | — | — | Crack | 0/100 | A | Increased crack | 0/100 | A |
| Ex. 20 | " | d | 50 | — | Good | 100/100 | A | Good | 100/100 | A |

TABLE 5-continued

| Example No. | Component A (Solid content 15.9%) Part by weight | Component B (Copolymer solution) Kind* | Part by weight | Melamine** Part by weight | Before boiling water resistance Appearance | Adhesion | Abrasion resistance | After boiling water resistance test Appearance | Adhesion | Abrasion resistance |
|---|---|---|---|---|---|---|---|---|---|---|
| Ex. 21 | " | c | 50 | 15 | " | " | A | " | " | A |

[Note]:
*The copolymer (c) and (d) have both a solid content of 20%.
**The melamine is a 70% solution of a methylated methylolmelamine in ethyl cellosolve (Sumimal M 55, a trade name of Sumitomo Chemical Company, Limited).

EXAMPLES 22 to 35 and Reference Examples 10 to 11

A solution of Component I, Component II or Component V, hexa(methoxymethyl)melamine [Component (C)], a polyol [Component (B)] or its Pre-condensate Solution (a) to (e) and a curing accelerator were mixed in the ratio as shown in Table 6. To the mixture was added ethyl cellosolve so that the solid content thereof became 10 to 40% to give coating compositions.

The coating compositions were applied to polycarbonate sheets which were previously washed and coated with Under Coating Composition (a) or (b), except Examples 27 and 31. The coated products were cured with a hot-air drier at 130° C. for 2 hours. The properties of the coating films thus prepared were tested in the same manner as described in Examples 1 to 11, and the results are shown in Table 7.

In these examples and reference examples, bisphenol type polycarbonate sheet and diethylene glycol bisallyl-carbonate sheet were used as the polycarbonate sheet. In both sheets, the same results were obtained.

TABLE 6

| Example No. | Under coating | Component A (100 parts by weight) | Components (B) and (C) (Pre-condensate) Kind | Part by weight | [Hexa(methoxy-methyl)-melamine] (Part by weight) | Additives |
|---|---|---|---|---|---|---|
| Ex. 22 | a | I | 1,4-Butanediol | 14 | 21 | P |
| Ex. 23 | a | I | Glycerin | 4 | 9 | P |
| Ex. 24 | a | V | Neopentyl glycol | 9 | 11 | Q |
| Ref. Ex. 10 | a | I | — | — | 35 | P |
| Ex. 25 | a | I | 1,4-Butanediol | 55 | — | P |
| Ex. 26 | a | I | a | 103 | — | P |
| Ex. 27 | — | I | a | 103 | — | P |
| Ex. 28 | b | II | a | 17 | — | P |
| Ex. 29 | a | V | a | 38 | — | R |
| Ref. Ex. 11 | b | V | a | 1 | — | P |
| Ex. 30 | a | V | b | 20 | — | P |
| Ex. 31 | — | V | b | 20 | — | P |
| Ex. 32 | b | I | b | 105 | — | P |
| Ex. 33 | a | I | c | 17 | — | R |
| Ex. 34 | a | I | d | 17 | — | R |
| Ex. 35 | a | I | e | 17 | — | R |

[Note]:
P: Ammonium thiocyanate (0.7 part)
Q: P-toluenesulfonic acid (0.2 part)
R: Ammonium nitrate (0.5 part)

TABLE 7

| Example No. | Before boiling water resistance Appearance | Adhesion | Abrasion resistance Steel wool test | Taber test** (Haze: %) | After boiling water resistance test Appearance | Adhesion | Abrasion resistance | Flexibility | Heat cycle test |
|---|---|---|---|---|---|---|---|---|---|
| Ex. 22 | Good | 100/100 | A | 29 | Good | 100/100 | A | Yes | Good |
| Ex. 23 | " | " | A | 18 | " | " | A | " | " |
| Ex. 24 | " | " | A | 15 | " | " | A | " | " |
| Ref. Ex. 10 | Crack | " | A | 22 | Increased crack | " | A | No | Increased crack |
| Ex. 25 | Good | " | B | 40 | Good | " | B | Yes | Good |
| Ex. 26 | " | " | B | 35 | " | " | B | " | " |
| Ex. 27 | " | " | B | 35 | " | 0/100 | * | " | " |
| Ex. 28 | " | " | A | 30 | " | 100/100 | A | " | " |
| Ex. 29 | " | " | A | 13 | " | " | A | " | " |
| Ref. Ex. 11 | Crack | " | A | 5 | Increased crack | " | A | No | Increased crack |
| Ex. 30 | Good | " | A | 7 | Good | " | A | Yes | Good |
| Ex. 31 | " | " | A | 7 | " | 0/100 | * | " | " |
| Ex. 32 | " | " | B | 42 | " | 100/100 | B | " | " |
| Ex. 33 | " | " | A | 20 | " | " | A | " | " |
| Ex. 34 | " | " | A | 20 | " | " | A | " | " |

TABLE 7-continued

| | Before boiling water resistance | | | | After boiling water resistance test | | | | |
|---|---|---|---|---|---|---|---|---|---|
| | | | Abrasion resistance | | | | | | |
| Example No. | Appearance | Adhesion | Steel wool test | Taber test** (Haze: %) | Appearance | Adhesion | Abrasion resistance | Flexi-bility | Heat cycle test |
| Ex. 35 | " | " | A | 23 | " | " | A | " | " |

[Note]:
*The coating film had an inferior adhesion, and hence, it was peeled off by rubbing a steel wool.
**The untreated polycarbonate sheet had a haze of 45 to 50%.

EXAMPLE 36

Copolymers or homopolymers were prepared by using a co-monomer or monomer, a solvent and a polymerization initiator as shown in Table 8. To the copolymers or homopolymers were added a crosslinking agent, a curing accelerator and a solvent as shown in Table 9 to give Under Coating Compositions (c) to (l).

A previously washed polycarbonate sheet was coated with the Under Coating Compositions (c) to (l). The coated products were cured with a hot-air drier at 130° C. for 10 minutes. The polycarbonate sheets undercoated with Under Coating Compositions (c) to (l) were coated with the coating composition as prepared in Example 29, and the resulting products were likewise cured at 130° C. for 2 hours. The coating films showed an excellent adhesion after the boiling water resistance test.

In this example, bisphenol type polycarbonate sheet and diethylene glycol bisallylcarbonate sheet were used as the polycarbonate sheet. In both sheets, the same results were obtained.

TABLE 8

| | Co-monomer or monomer | | | | | | Solvent | | Polymerization initiator | | Polymerization conditions | |
|---|---|---|---|---|---|---|---|---|---|---|---|---|
| Polymer | Kind | Weight (g) | Kind | Weight (g) | Kind | Weight (g) | Kind | Weight (g) | Kind | weight (g) | Temperature (°C.) | Time (hr) |
| c | 2-Hydroxyethyl methacrylate | 36 | Dimethyl-aminoethyl methacrylate | 44 | — | — | Ethyl cellosolve | 320 | Azobisiso-butyronitrile | 0.4 | 90 | 2 |
| d | 2-Hydroxyethyl methacrylate | 20 | Dimethyl-aminoethyl methacrylate | 20 | Methyl methacrylate | 60 | " | " | " | " | " | " |
| e | 2-Hydroxyethyl methacrylate | 51.5 | Acrylic acid | 28.5 | — | — | " | " | " | " | " | " |
| f | 2-Hydroxyethyl methacrylate | 38 | Glycidyl methacrylate | 42 | — | — | " | " | " | " | 80 | 4 |
| g | 2-Hydroxyethyl methacrylate | 51.7 | Acrylamide | 28.3 | — | — | Ethyl cellosolve + water | 220 100 | " | " | " | 6 |
| h | 2-Hydroxyethyl methacrylate | 45 | N-Methylol-acrylamide | 35 | — | — | Ethyl cellosolve | 320 | " | " | " | " |
| i | 2-Hydroxyethyl methacrylate | 40 | Tetrahy-drofurfuryl methacrylate | 52 | — | — | " | 360 | " | 0.5 | " | 2 |
| j | Acrylamide | 20 | Tetrahy-drofurfuryl methacrylate | 50 | — | — | Ethyl cellosolve + water | 230 100 | " | 0.4 | 90 | " |
| k | " | 50 | — | — | — | — | Water | 200 | Ammonium persulfate | 0.5 | 80 | " |
| l | Acrylic acid | 20 | — | — | — | — | " | " | Ammonium peroxide | " | 90 | " |

TABLE 9

| Under coating composition | Copolymer or homopolymer | | Crosslinking agent | | Curing accelerator | | Solvent | |
|---|---|---|---|---|---|---|---|---|
| | Kind | Weight (g) | Kind | Weight (g) | Kind | Weight (g) | Kind | Weight (g) |
| c | c | 100 | Hexa(metoxy-methyl)-melamine | 1.4 | NH$_4$Cl | 0.19 | Ethyl cellosolve | 900 |
| d | d | " | Hexa(metoxy-methyl)-melamine | 0.7 | " | 0.10 | Ethyl cellosolve | " |
| e | e | " | Hexa(metoxy-methyl)-melamine | 1.9 | " | 0.27 | Ethyl cellosolve | " |
| f | f | " | Hexa(metoxy-methyl)-melamine | 1.4 | " | 0.20 | Ethyl cellosolve | " |

TABLE 9-continued

| Under coating composition | Copolymer or homopolymer Kind | Weight (g) | Crosslinking agent Kind | Weight (g) | Curing accelerator Kind | Weight (g) | Solvent Kind | Weight (g) |
|---|---|---|---|---|---|---|---|---|
| g | g | " | Hexa(metoxy-methyl)-melamine | 1.9 | " | 0.27 | Ethyl cellosolve + water | 675 225 |
| h | h | " | Hexa(metoxy-methyl)-melamine | 1.7 | " | 0.24 | Ethyl cellosolve | 900 |
| i | i | " | Hexa(metoxy-methyl)-melamine | 1.3 | " | 0.18 | Ethyl cellosolve | " |
| j | j | " | Hexa(metoxy-methyl)-melamine | 1.4 | " | 0.20 | Ethyl cellosolve + water | 675 225 |
| k | k | " | Hexa(metoxy-methyl)-melamine | 2.0 | " | 0.08 | Ethyl cellosolve + water | 300 600 |
| l | l | " | Hexa(metoxy-methyl)-melamine | 1.0 | " | 0.05 | Ethyl cellosolve + water | 150 300 |

EXAMPLE 37

An under coating composition and a silicic coating composition were prepared as follows:

(1) Preparation of an under coating composition:

2-(N,N-Dimethylamino)ethyl methacrylate (7 g), methyl methacrylate (8 g), 2-hydroxyethyl methacrylate (5 g) and benzoyl peroxide (0.2 g) were dissolved in ethyl cellosolve (80 g), and the mixture was stirred at 85° C. for 4 hours and further at 100° C. for 30 minutes under nitrogen gas to effect copolymerization. To the resulting solution (10 parts) was added ethyl cellosolve (90 parts) to give a copolymer solution for under coating.

(2) Preparation of a silicic coating composition:

Tetraethoxysilane (66.7 g) and methyltrimethoxysilane (33.3 g) were dissolved in isopropyl alcohol (70 g), and thereto was added 0.05 N hydrochloric acid (30 g). The mixture was stirred at room temperature to effect hydrolysis. After the reaction, the resulting mixture was matured at room temperature for 20 hours or more. To a solution of a partial hydrolyzate of silicon compounds (100 parts) and the copolymer solution for under coating (30 parts) obtained above were dissolved a mixture of n-butanol (80 parts) acetic acid (40 parts) and sodium acetate (0.4 part) to give a coating composition.

A polycarbonate sheet (thickness: 2 mm) was washed with a neutral detergent and then with water and coated with the under coating composition obtained above. The coated product was cured with a hot-air drier at 130° C. for 30 minutes. The under-coated polycarbonate sheet was coated with the silicic coating composition obtained above, and the resulting product was cured with a hot-air drier at 130° C. for 2 hours. The thus treated polycarbonate sheet had a clear, smooth surface, which was not injured even by strongly scratching with a finger nail and had a good surface hardness (abrasion resistance by the steel wool test: no scratch) and also had a good adhesion (the crosscut tape test: no peeling off, 100/100).

In this example, bisphenol type polycarbonate sheet and diethylene glycol bisallylcarbonate sheet were used as the polycarbonate sheet. In both sheets, the same results were obtained.

EXAMPLE 38

A silicic coating composition was prepared in the same manner as described in Example 37 except that a copolymer of butyl acrylate and 2-hydroxyethyl methacrylate (ratio by weight: 4/1) (6 parts) was used instead of the copolymer solution for under coating (30 parts). A polycarbonate sheet was treated in the same manner as in Example 37. The thus treated polycarbonate sheet had a clear, smooth surface, a good adhesion (the cross-cut tape test: 100/100) and a good surface hardness (abrasion resistance by the steel wool test: no scratch).

In this example, bisphenol type polycarbonate sheet and diethylene glycol bisallylcarbonate sheet were used as the polycarbonate sheet. In both sheets, the same results were obtained.

EXAMPLE 39

A polymethyl methacrylate sheet (thickness: 2 mm), one surface of which was mirror-finished by depositing aluminum thereon in a vacuum, was coated with the same under coating composition as used in Example 37. The coated product was cured at 80° C. for 60 minutes. The resulting sheet was further coated with the same silicic coating composition as used in Example 38, and the resulting product was cured at 80° C. for 2 hours. The polymethyl methacrylate sheet thus treated had no haze and was clear in both surfaces, and had a good adhesion (the cross-cut tape test: 100/100) and a good surface hardness (the steel wool test: no scratch) in both surfaces, and both sides of the sheet act as mirrors.

Reference Example 12

A polymethyl methacrylate sheet was treated in the same manner as described in Example 39 except that the under coating composition was not coated. The polymethyl methacrylate sheet thus treated had a good adhesion (the cross-cut tape test: 100/100) in the surface which was not deposited with aluminum, but the surface which was deposited had a bad adhesion (the cross-cut tape test: 0/100) and had a bad surface hardness (the steel wool test: scratches, wherein the deposited metal was deleted and hence the sheet could be seen through).

EXAMPLE 40

An aluminum sheet (thickness: 1 mm, JIS A 1050 P) was coated with the under coating composition as used in Example 37, and the coated product was cured at 140° C. for 30 minutes. The under-coated aluminum sheet was further coated with the silicic coating compo-

What is claimed is:

1. A coating composition consisting essentially of:
(A) 100 parts by weight of partially hydrolyzed silicon compounds consisting essentially of co-partial hydrolyzates of a tetraalkoxysilane of the formula $(Si(OR^1)_4$ wherein $R^1$ is an alkyl having 1 to 4 carbon atoms and an organic silicon compound of the formula: $R_n^2Si(OR^3)_{4-n}$ wherein n is an integer of from 1 to 3, $R^2$ is a hydrocarbon group having 1 to 6 carbon atoms and $R^3$ is an alkyl having 1 to 4 carbon atoms and/or a mixture of partial hydrolyzates of each tetraalkoxysilane and organic silicon compound, said partially hydrolyzed silicon compounds containing said partially hydrolyzed tetraalkoxysilane, calculated as $SiO_2$, and said organic partially hydrolyzed silicon compound, calculated as $R_n^2SiO_m$ wherein $m=(4-n)/2$, in the ratio of 5/95 to 95/5 by weight, and the weight (100 parts by weight) of said partially hydrolyzed silicon compounds being also calculated as $SiO_2$ for said partially hydrolyzed tetraalkoxysilane and as $R_n^2SiO_m$ for said partially hydrolyzed organic silicon compound,
(B) 10 to 400 parts by weight of a monomer or oligomer having two or more hydroxy groups, and
(C) 0 to 300 parts by weight of an etherified methylolmelamine, wherein said etherified methylolmelamine is contained in an amount of 0.5 to 1.5 gram equivalent per 1 gram equivalent of the monomer or oligomer, said composition being dissolved in a solvent.

2. The coating composition according to claim 1, wherein n in the formula: $R_n^2Si(OR^3)_{4-n}$ is 1.

3. The coating composition according to claim 1, wherein the partially hydrolyzed silicon compounds of component (A) contain said tetraalkoxysilane, calculated as $SiO_2$, and said organic silicon compound, calculated as $R_n^2SiO_m$, in the ratio of 30/70 to 80/20 by weight.

4. The coating composition according to claim 1, wherein the component (B) is used in an amount of 20 to 250 parts by weight per 100 parts by weight of the component (A).

5. The coating composition according to claim 1, wherein the monomer or oligomer having two or more hydroxy groups of component (B) is a member selected from the group consisting of ethylene glycol, diethylene glycol, triethylene glycol, propylene glycol, dipropylene glycol, 1,3-propanediol, 1,3-butanediol, 1,4-butanediol, 2,3-butanediol, 1,6-hexanediol, 1,8-octanediol, 1,10-decanediol, neopentyl glycol, pentaerythritol, glycerin and sorbitol.

6. The coating composition according to claim 1, wherein the monomer or oligomer having two or more hydroxy groups of component (B) is a member selected from the group consisting of polyethylene glycols, polypropylene glycols and ethylene glycolpropylene glycol copolymers which have a molecular weight of less than 500.

* * * * *